(12) United States Patent
Knipping et al.

(10) Patent No.: US 6,717,750 B2
(45) Date of Patent: Apr. 6, 2004

(54) MAGNIFYING GLASS FOR NEEDLEWORK, HANDICRAFTS, OR FOR READING OR SIMILAR

(76) Inventors: Klaus Knipping, Lüdenscheider Strasse 40, 58762 Altena (DE); Heinz-Gerd Rump, Am Stübchenstück 25, 58769 Nachrodt-Wiblingwerde (DE)

( * ) Notice: Subject to any disclaimer, the term of this patent is extended or adjusted under 35 U.S.C. 154(b) by 37 days.

(21) Appl. No.: 10/182,364

(22) PCT Filed: Feb. 10, 2001

(86) PCT No.: PCT/EP01/01480
§ 371 (c)(1),
(2), (4) Date: Jul. 27, 2002

(87) PCT Pub. No.: WO01/65298
PCT Pub. Date: Sep. 7, 2001

(65) Prior Publication Data
US 2003/0011897 A1 Jan. 16, 2003

(51) Int. Cl.[7] .................................. G02B 27/02
(52) U.S. Cl. ........................ 359/803; 359/802
(58) Field of Search ................. 359/802, 803, 359/804, 805, 806, 807, 808, 822

(56) References Cited

U.S. PATENT DOCUMENTS

| 3,753,611 A | | 8/1973 | Ebbesen | |
|---|---|---|---|---|
| 5,442,488 A | * | 8/1995 | Pastorino | 359/802 |
| 5,754,349 A | * | 5/1998 | Hon | 359/813 |

FOREIGN PATENT DOCUMENTS

| DE | 726352 | 6/1933 |
|---|---|---|
| DE | 1497658 | 4/1970 |

* cited by examiner

Primary Examiner—Hung X. Dang
(74) Attorney, Agent, or Firm—Friedrich Kueffner

(57) ABSTRACT

The invention relates to a magnifying glass which is secured in a frame (20). Said magnifying glass consists of a combination of lenses (10) comprising a principal lens (11) with a secondary lens (12) forming an integral unit therewith. The secondary lens (12) is integrated into the principal lens in an eccentric position and has a higher magnification in relation to the principal lens (11). To obtain a magnifying glass which is convenient to use under all respective working conditions, the inventive lens combination (10) is rotatably mounted (18, 18') in the frame (20).

10 Claims, 3 Drawing Sheets

MAGNIFYING GLASS FOR NEEDLEWORK, HANDICRAFTS, OR FOR READING OR SIMILAR

The invention concerns a magnifying glass of the type described in the introductory clause of claim 1. If necessary, in order to be able to use a higher magnification than that provided by the primary lens, the primary lens is provided with an eccentrically positioned secondary lens. This assembly, which consists of a primary and a secondary lens, will be referred to below simply as a lens combination.

In the previously known magnifying glass of this type (Prym company publication entitled "Universal-Lupe" [Universal Magnifying Glass]), the lens combination was rigidly connected with the part of the frame that holds it. The frame was secured to the user's body by means of attachment, which consisted of a hinged bracket mounted on the frame. The bracket fit around the user's neck. The position of the lens combination relative to the user's eyes could be varied by a swivel connection between the frame part or by changing the support position of the frame, on the one hand, and of the bracket on the user's body, on the other hand. Apart from the fact that these position changes of the frame were difficult to make, unfavorable positions of the secondary lens were produced, which could not be satisfactorily corrected by changing the position of the head or of the work.

In a bifocal magnifying glass (DE-AS 14 97 658), it is well known that a segmented magnifying glass part can be mounted on a spherical support lens. This lens is intended as an aid to vision for persons with poor vision, and the magnifying glass part is held in the desired position in front of the eyes. Rotation of this lens combination is neither intended nor permitted.

A bifocal magnifying glass of another type (DE-OS 21 46 043), which is designed to be secured on one eye, uses a stationary, nonrotatable primary lens and a separate secondary lens with a center of gravity arranged eccentrically to the principal axis of the magnifying glass. The secondary lens is held in an inner groove of the mount, independently of the primary lens, and is able to turn by the force of its own weight. Regardless of how the bifocal magnifying glass is placed in front of the eye, the secondary lens rolls in front of the primary lens until its center of gravity assumes the lowest position in the inner groove. Joint rotation of the secondary lens with the primary lens is neither intended nor suitable.

The goal of the invention is to develop an inexpensive, reliable magnifying glass of the type specified in the introductory clause of claim 1, which can be conveniently adjusted to the specific working conditions. In accordance with the invention, this goal is achieved by the measures specified in the characterizing clause of claim 1, which have the following special significance.

Its rotatable mounting in the frame allows the lens combination of the invention to be brought into a rotated position in which the supplementary lens can be brought into the desired specific position relative to the work. If there is a change in the angle of view and/or the position of the work, the changed position of the secondary lens that is now desired can then be readjusted by rotation. Since the adjustment of the magnifying glass can be adapted to the given working conditions by its rotatable mounting in the frame, the position of the frame on its support surface or on the place of support on the user's body does not need to be changed. Optimum use of the magnifying glass is always possible.

Additional measures and advantages of the invention are specified in the subclaims and are described below with reference to the drawings. The drawings show two embodiments of the invention.

Figure 1:
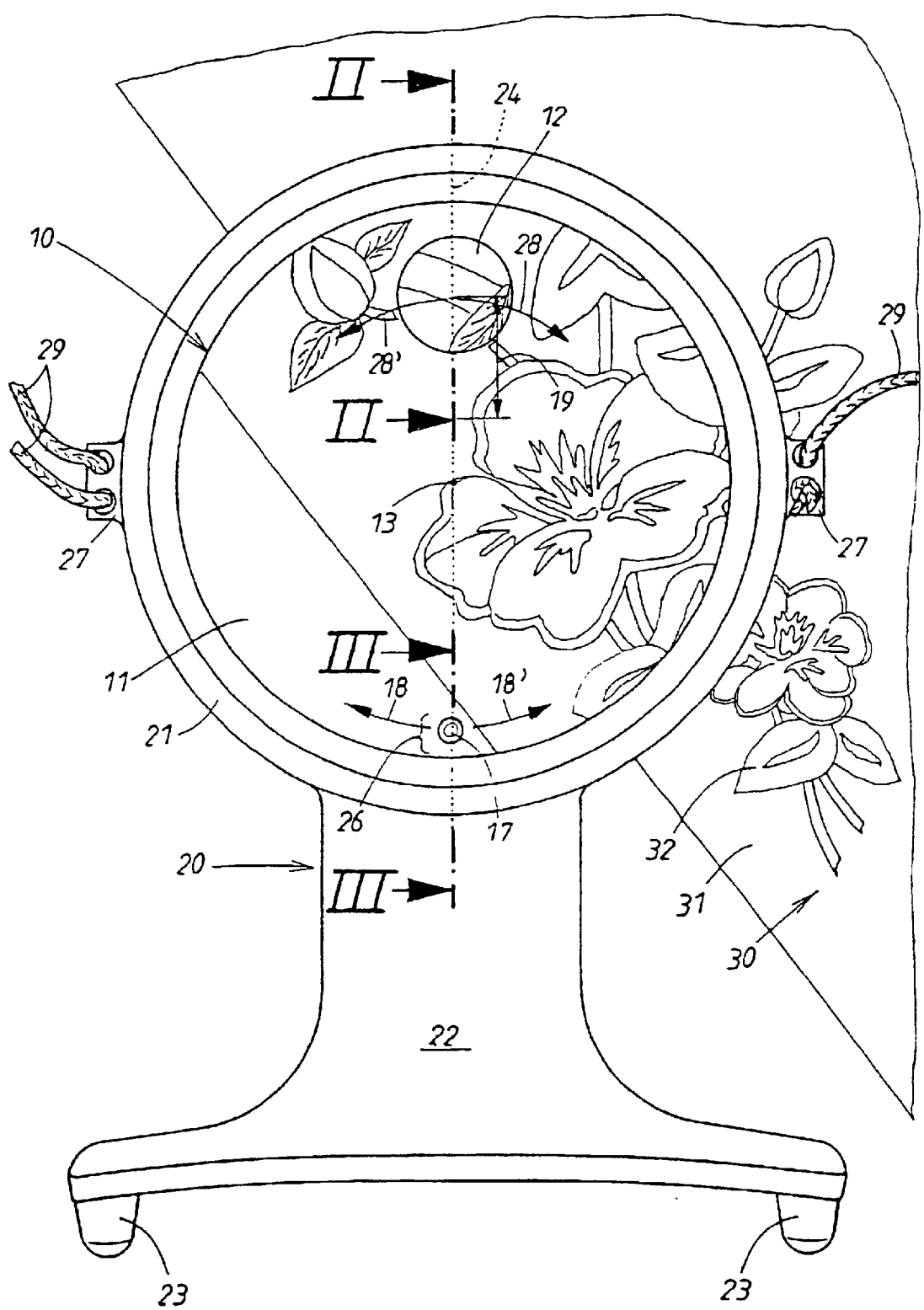
FIG. 1 shows a view of a first embodiment of the magnifying glass of the invention.

The magnifying glass of the invention consists of a lens combination 10, which is rotatably mounted in a frame 20. The lens combination comprises a large-surface primary lens 11 and a small secondary lens 12. As FIG. 1 illustrates, the two lenses 11, 12 produce two different magnifications for a user of the magnifying glass who is looking at a piece of work 30. In FIG. 1, the work 30 consists of a flat piece of textile material 31, on which embroidery 32 is to be performed. The primary lens 11 provides a certain amount of magnification, e.g. ×2, while the secondary lens 12 provides still greater magnification, e.g., ×8.

Figure 2:
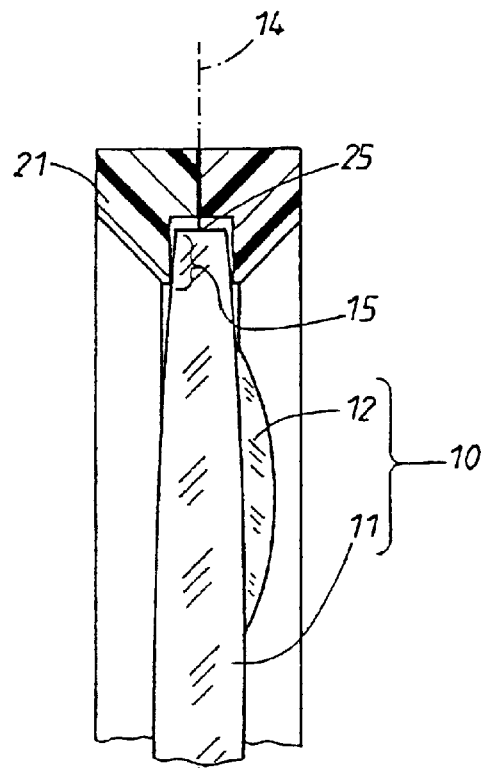
FIGS. 2 and 3 show enlarged partial cross sections through the magnifying glass along section lines II—II and III—III, respectively, in FIG. 1.
Figure 3:
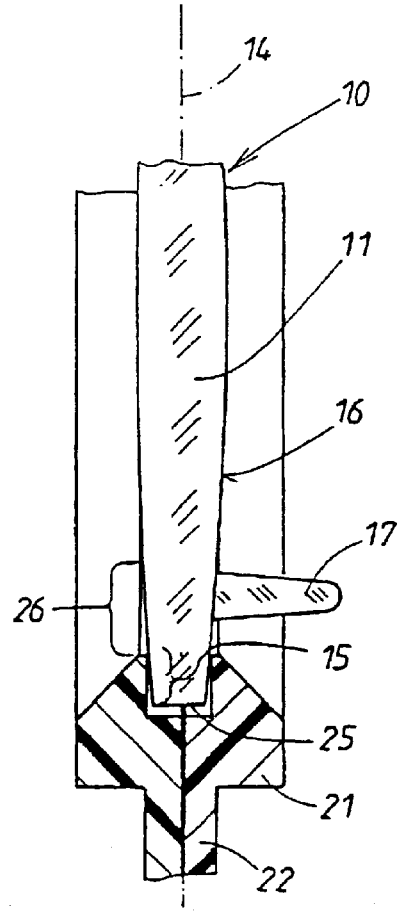

The lens combination 10 is mounted in a frame 20. The frame 20 consists of a support frame 21, which is connected with other frame parts 22 and supports 23. As FIGS. 2 and 3 show, the support frame 21 surrounds the peripheral edge 15 of the lens combination 10, which results in the formation of a rotational friction bearing 25. In this case, a handle 17 is located on the viewing side 16 of the primary lens 11. In the case shown here, the handle consists of a pin or button, which is located a certain distance from the plane 14 of the lens (indicated by the dot-dash line in FIG. 3) and runs especially more or less perpendicularly to the plane 14 of the lens. The lens combination 10 can be turned relative to the frame 20 by this handle 17 in the directions indicated by arrows 18, 18'.

This results in an axis of rotation 13 that lies in the center of the lens combination 10 and runs perpendicularly to the plane 14 of the lens. The pin 17 that serves as the handle runs essentially parallel to this, i.e., parallel to the axis. The secondary lens 12 is eccentrically positioned relative to the axis of rotation 13: it is laterally displaced as indicated by 19 in FIG. 1. Consequently, when the rotation 18, 18' referred to above is performed, the secondary lens 12 is moved in the direction indicated by arrows 28, 28'. If the angle of view of the viewer remains unchanged, the secondary lens 12 then assumes a different rotational position, which allows a view of a different region of the work 30. During this process, the position of the frame 20 relative to the viewer does not need to be changed.

A dotted line in FIG. 1 shows a diameter 24 on which both the secondary lens 12 and the handle 17 are located. In this connection, the handle 17 is located on the opposite side of the axis of rotation 13 from the secondary lens 12. To obtain a high torque, the handle 17 is located in a marginal region 26, which positions it as closely as possible to the support frame 21.

Naturally, the handle 17 for effecting rotation may have a different design. It could be positioned in a selected place on the frame 20 and provide the rotational movement 28, 28' of the lens combination 10 in the support frame 21 by means of a turning gear or the like. In this case, the manipulating device would be a turning knob.

The frame 20 may be designed in any desired way. It may be placed standing on a support surface or hanging on the body of the user. The latter is realized in the present case. The frame 20 fits on the body of the viewer by means of supports 23. In the peripheral region of the support frame 21, there are points of attachment 27 for support devices 29 applied on the body of the viewer. In the present case, this support device 29 consists of a cord. The points of attachment are designed as diametrically opposed brackets 27 on the frame 20 and are provided with bores, through which the cord 29 passes. The cord 29 forms a loop, which goes around the back of the user.

If necessary, the frame 20 may be equipped with an illuminating device, which may be integrated in frame part 22 and/or in the support frame 21.

Figure 4:
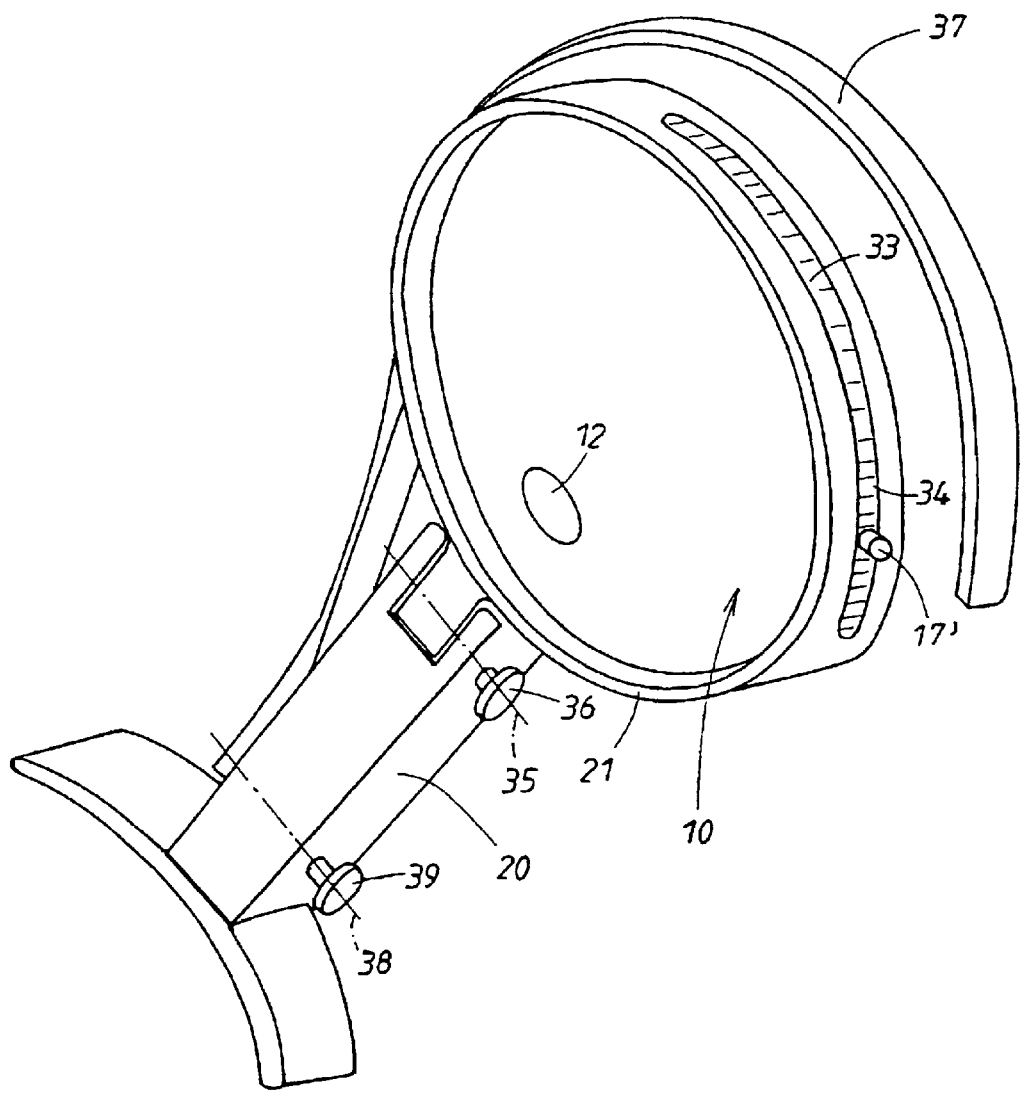
FIG. 4 shows a perspective view of an alternative embodiment of the invention.

The embodiment shown in FIG. 4 has essentially the same design as the magnifying glass shown in the preceding embodiment. It is only necessary to discuss the differences. Otherwise, the above specifications and reference numbers still apply.

One important difference is that a turning handle 17' is no longer arranged parallel to the axis of rotation of the magnifying glass, but rather is arranged radially to it. The turning handle 17' is positioned on the periphery 33 of the lens combination 10. In the present case, it travels in a slot 34 in the support frame 21, which is able to limit the rotation of the lens combination 10.

In addition, the support frame 21 is connected with the frame 20 by a swivel axis 35 that runs transversely to the axis of rotation 13, which allows the support frame 21 to be angled into an optimum position relative to the frame 20. A locking device 36, such as a clamp screw, is used to set the desired angular position of the support frame 21. In addition, a stirrup 37 is mounted on the frame 20 on another swivel axis 38, which can be set in various positions relative to the frame 20 and to the lens combination 10. A locking device 39 in the region of the axis 38 is used for position stabilization.

LIST OF REFERENCE NUMBERS

| | |
|---|---|
| 10 | lens combination |
| 11 | large-surface primary lens |
| 12 | small secondary lens |
| 13 | axis of rotation of 10 |
| 14 | lens plane |
| 15 | peripheral edge |
| 16 | viewing side of 11 |
| 17 | handle, pin (FIGS. 1–3) |
| 17' | handle, pin (FIG. 4) |
| 18 | arrow indicating direction of rotation of 17 |
| 18' | arrow indicating direction of rotation of 17 |
| 19 | displacement of 12 relative to 13 |
| 20 | frame |
| 21 | support frame on 20 |
| 22 | frame parts of 20 |
| 23 | support of 20 |
| 24 | diameter for 12/17 |
| 25 | rotational friction bearing between 15/21 |
| 26 | marginal piece |
| 27 | point of attachment for 29/brackets |
| 28 | arrow indicating direction of rotation of 12 |
| 28' | arrow indicating direction of rotation of 12 |
| 29 | support device for 20/cord |
| 30 | work/embroidery work |
| 31 | flat piece of textile material |
| 32 | embroidery |
| 33 | periphery of 10 (FIG. 4) |
| 34 | slot for 17' (FIG. 4) |

-continued
LIST OF REFERENCE NUMBERS

| | |
|---|---|
| 35 | swivel axis (FIG. 4) |
| 36 | locking device (FIG. 4) |
| 37 | stirrup (FIG. 4) |
| 38 | swivel axis (FIG. 4) |
| 39 | locking device (FIG. 4) |

What is claimed is:

1. Magnifying glass for embroidery, handicrafts, reading and the like with a primary lens (11), which is mounted in a preferably stationary frame (20), such that a secondary lens (12) is integrated in the primary lens (11) in such a way that the two lenses form a lens combination (10), and such that the secondary lens (12) is integrated in the primary lens (11) in an eccentric position (19) and has a higher magnification than the primary lens (11), wherein the fact that the frame (20) has a fixed support frame (21), which surrounds the peripheral edge (15) of the lens combination (10) and forms a rotational friction bearing (25), in which the lens combination (10) is rotatably (28, 28') supported, and the axis of rotation (13) of the lens combination (10) runs perpendicularly to the plane of the lens combination (10), and by the fact that a turning handle (17) is provided for rotational adjustment (18, 28) of the lens combination (10).

2. Magnifying glass in accordance with claim 1, wherein the fact that the turning handle (17) is attached to the lens combination (10).

3. Magnifying glass in accordance with claim 2, wherein the fact that the turning handle (17) is mounted directly on the viewing side (16) of the primary lens (11).

4. Magnifying glass in accordance with claim 2, wherein the fact that the turning handle consists of a pin (17), which is located in the peripheral region (26) of the primary lens (11) and runs essentially parallel to the axis of rotation (13) of the lens combination (10).

5. Magnifying glass in accordance with claim 2, wherein the fact that the turning handle (17') is located on the periphery (33) of the lens combination (10).

6. Magnifying glass in accordance with claim 5, wherein the fact that the turning handle (17') travels in a slot (34) in the support frame (21).

7. Magnifying glass in accordance with claim 1, wherein the fact that the turning handle (17) lies essentially on a diameter (24) of the lens combination (10) that passes through the secondary lens (12) and is positioned on the opposite side of the axis of rotation (13) from the secondary lens (12).

8. Magnifying glass in accordance with claim 1, wherein the fact that the frame (20) rests on a support surface during use.

9. Magnifying glass in accordance with claim 1, wherein the fact that the frame (20) hangs on the body of the user during use.

10. Magnifying glass in accordance with claim 1, wherein the fact that an illuminating device for a piece of work (30) is integrated in the frame (20).

* * * * *

UNITED STATES PATENT AND TRADEMARK OFFICE
CERTIFICATE OF CORRECTION

| | | |
|---|---|---|
| PATENT NO. | : 6,717,750 B2 | Page 1 of 1 |
| APPLICATION NO. | : 10/182364 | |
| DATED | : April 6, 2004 | |
| INVENTOR(S) | : Klaus Knipping et al. | |

It is certified that error appears in the above-identified patent and that said Letters Patent is hereby corrected as shown below:

Title Page, Item (73) Assignee: should read:

[73]    Assignee: William Prym GmbH & Co. KG
         Stolberg, Germany

Signed and Sealed this

Nineteenth Day of February, 2008

JON W. DUDAS
*Director of the United States Patent and Trademark Office*